United States Patent [19]

Garbade et al.

[11] Patent Number: 4,645,018

[45] Date of Patent: Feb. 24, 1987

[54] PROCESS AND DEVICE FOR RECORDING THE WEIGHT OF REFUSE MATERIAL AS THE MATERIAL IS EMPTIED INTO A REFUSE COLLECTING VEHICLE

[75] Inventors: Rolf Garbade, Lilienthal; Hans J. Kahle, Oldenburg; Hans H. Schreier, Oldenburg; Wolfgang Jabbusch, Oldenburg, all of Fed. Rep. of Germany

[73] Assignee: Pontech Gesellschaft fur Technologische Entwicklungen mbH, Bremen, Fed. Rep. of Germany

[21] Appl. No.: 813,047

[22] Filed: Dec. 24, 1985

[30] Foreign Application Priority Data

Dec. 28, 1984 [DE] Fed. Rep. of Germany ....... 3447648

[51] Int. Cl.[4] ..................... G01G 23/38; G01G 19/08; G01G 19/00

[52] U.S. Cl. ....................................... 177/6; 177/139; 177/145

[58] Field of Search ..................... 177/6, 25, 139, 141, 177/151-153, 145

[56] References Cited

U.S. PATENT DOCUMENTS

| | | | |
|---|---|---|---|
| 1,762,196 | 6/1930 | Schellentrager | 177/6 |
| 2,851,171 | 9/1958 | Martin et al. | 177/139 X |
| 3,910,364 | 10/1975 | Baker | 177/145 |
| 4,123,970 | 11/1978 | Quante | 177/25 X |
| 4,228,864 | 10/1980 | Berger et al. | 177/145 |
| 4,281,729 | 8/1981 | Farley et al. | 177/139 |

*Primary Examiner*—George H. Miller, Jr.
*Attorney, Agent, or Firm*—Collard, Roe & Galgano

[57] ABSTRACT

There is provided a method and device for recording the weight of refuse material emptied from a container into a collecting vehicle by means of an unloading device. The gross weight of the filled container and the dead weight of the emptied container are determined while the container is being emptied by the unloading device of a refuse collecting vehicle. Each container is identified and the identification and weight data are supplied to a recording and control system. The device for carrying out this process is adapted to be integrated in the unloading devices of the collecting vehicle.

13 Claims, 1 Drawing Figure

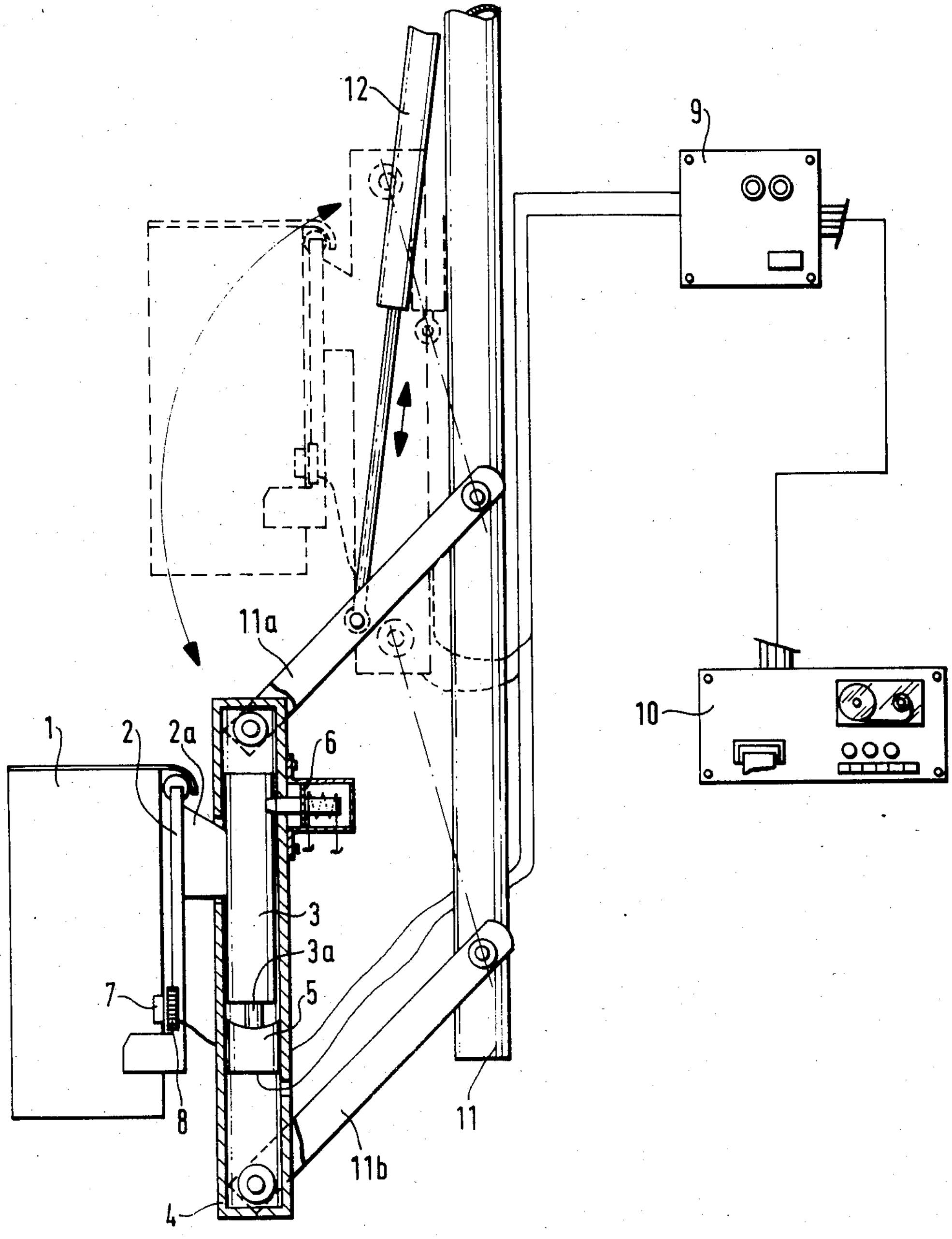
12
9
11a
10
1
2
2a
6
3
3a
7
5
8
11
11b
4

PROCESS AND DEVICE FOR RECORDING THE WEIGHT OF REFUSE MATERIAL AS THE MATERIAL IS EMPTIED INTO A REFUSE COLLECTING VEHICLE

The present invention relates to a process and a device for recording the weight of material, preferably refuse, emptied from a container into a refuse collecting vehicle by means of a known unloading device.

The disposal of refuse from commercial operations and communities is causing growing problems due to the amounts of refuse being collected. Part of the problem is the fact that available refuse dumps are no longer adequate, and that the dumping of refuse and even the incineration of refuse causes pollution of the environment. A reduction of the amounts of refuse collected is deemed desirable.

The lump-sum fees charged commercial operations and private housholds for refuse disposal do not offer any incentive for reducing the amounts of refuse or for voluntarily sorting refuse and recycling reusable components in recycling processes.

Any reduction of the total amount of refuse so collected can be expected only if such commercial operations and households are offered reasonable charges and the possibility of separating the refuse.

Environmental considerations are taken into account only in a few areas of refuse disposal. Specifically, in the household refuse area, the possibility of recycling valuable waste is offered only for glass and old paper.

The heterogeneous composition of refuse, which varies greatly, does not yet permit an economical way of separating reusable individual materials. The dumping and incineration of unsorted refuse represents the current state of the art.

In the future, we must anticipate that because of stricter environmental protection requirements, the disposal of waste will become increasingly expensive.

Recycling can only be realized if industry and households are given special financial incentives, i.e., the possibility of having some control over the fees they are charged for waste disposal. Only such incentives will substantially reduce the amount of refuse collected, with the secondary effect of allowing a separation of the refuse by types of material, relief of waste dumps and protection of the environment.

It is the object of the present invention to provide a process and device for recording the amount of waste collected from commercial operations and individual households by means of a recordable weighing operation.

This object is accomplished in accordance with the present invention by means of a process wherein the filled or loaded container is placed into the unloading device of the refuse collecting vehicle, whereby an identification element arranged on the waste container interacts with a sensor/identification element arranged on the unloading device, the filled container is first weighed by a weighing system integrated in the unloading device, and weighed a second time after the unloading device has been swung back after emptying, the container is then removed and the identification signals and the two weight signals are supplied to a recording and storing system.

This procedure permits the determination of the gross weight of the loaded container and dead weight of the emptied container while the container is being emptied by means of the unloading device of the refuse collecting vehicle.

The measurement signals are transmitted to a computing and recording device by means of a measurement signal amplifier. This computing and recording device may be installed in the driver's cabin of the vehicle. The weight signals are processed by this processor unit and the computed net weight of the content of the container is supplied to a magnetic tape unit serving as a data memory. In order to permit the weight so determined to be correlated with the individual commercial operations or households, each refuse receptacle requires a coded identifier which is "read" by a recognition or identification unit located on the receiving plate of the unloading device. This recognition signal is also stored on the magnetic tape by means of the computing unit. The data thus recorded may be printed out immediately, if need be.

According to another feature of the present invention, the process may be designed in such a way that the container, after it has been placed in the unloading device and before it is swung up and emptied, is lifted and weighed (first weighing) in the lifted position, then after the container has been swung up and emptied, the container is swivelled back into the lifted position and weighed again (second weighing) in this position, and the container is then lowered for its removal. Furthermore, the weighing system may be automatically unlocked prior to each weighing operation and automatically locked after each weighing operation.

Also, the process may be designed to that it functions nearly fully automatically. In particular, the weighing operations may be controlled time-wise by position-signalling devices, and the weighing system, after each of the two weighing operations have been completed, may supply the unloading device with control pulses for automatically initiating the subsequent steps of the unloading process. If a container is not identified, for example, if the interaction between the identification elements arranged on the refuse container and the sensor/identification or recognition element has not been established, the hydraulic system of the unloading device may be automatically blocked, in which case a signal is given for alerting the operator to the error.

In this way, the overall process may be designed in such a way that the operator only has to actuate a main control switch and the internal logic of the control system prevents emptying of the refuse container without identification and weighing.

The weighing system for carrying out the process of the present invention is coupled with the device receiving the container, and the weighing system is provided in the form of a unit which is integrated in the unloading device.

By such a solution, a unit is provided which may be integrated as an additional unit or a unit for later installation in the known unloading device of refuse collecting vehicles. The advantage is that only minor design modifications are required in the manufacture of new known unloading devices. Another advantage is that the device of the present invention may be installed in existing refuse collecting vehicles.

According to the present invention, the weighing system includes the further feature that the device for receiving the container is connected to a vertically displaceable sliding piece arranged in the weighing system. This sliding piece interacts with a measuring cell. A device may also be provided for locking said sliding piece.

According to another feature of the present invention, the sliding piece may be provided in the form of a rod-like body capable of being displaced in a tube. The rod-like body in turn may interact with a measuring cell disposed in the tube. Preferably, the tube is provided in the form of a support tube capable of being integrated in the unloading device and supporting all parts of the weighing system. the support tube may be connected to the unloading device by way of parallelogram controllers which are swivelled by lifting cylinders. In particular, with such a design, the device of the invention may be installed as an additional unit fitted in existing unloading devices.

Other objects and features of the present invention will become apparent from the following detailed description considered in connection with the accompanying drawing. It is to be understood, however, that the drawing is designed as an illustration only and not as a definition of the limits of the invention.

In the drawing there is shown schematically the device according to the present invention for performing the inventive process.

Now, turning to the drawing, there is shown a known unloading device (dumping device) of a refuse collecting vehicle, by means of which the refuse container may be emptied into the refuse collecting vehicle. The drawing shows only the downwardly projecting support and swivelling tube 11. Normally, the support and swivelling tube 11 has two pairs of parallelogram controllers are levers 11*a*, 11*b* articulated on the tube. The free ends of these levers are articulated on the device for receiving the refuse container. The pairs of parallelogram levers 11*a*, 11*b* are swivelled up and down by means of one or a plurality of lifting cylinders 12 for receiving the refuse container. Cylinder 12 engages the top or bottom pair of parallelogram levers 11*a* or 11*b*.

The weighing system is arranged on the free ends of the pairs of parallelograms levers 11*a*, 11*b* instead of the commonly used device for receiving the refuse container. The weighing system is provided with a vertical support tube 4 articulated on said parallelogram levers. A sliding body 3 is arranged in said tube 4. A support plate 2*a* is attached to sliding body 3, plate 2*a* extends through an opening in support tube 4 and is supportingly connected to refuse container receiving device 2 for receiving the refuse container.

A refuse container designated 1 is placed on device 2 for receiving the container. An identification plate 7 is fastened on the back side of container 1 in such a way that when the refuse container is placed on the weighing system, it is disposed opposite a recognition sensor 8 which is integrated in refuse container receiving device 2.

A measuring cell 5 is disposed in support tube 4 beneath sliding body 3, so as to interact with sliding body 3. In the present embodiment, sliding body 3 has a downwardly projecting pin 3*a*, which acts on measuring cell 5 which is provided in the form of a piezo element or a strain gauge. Reference numeral 6 designates a locking device arranged on the outer side of supporting tube 4. This locking device has a locking pin which, preferably, is displaceable electromagnetically and which is capable of being displaced against sliding body 3 through an opening in the supporting tube 4, so that the sliding body can be locked and thus prevented from movement.

Recognition sensor 8 and measuring cell 5 are electrically connected to a signal amplifier 9 which, in turn, is electrically connected to a recording unit 10. Recording unit 10 serves to record and store the recognition data received from sensor 8 and the weighing data received from measuring cell 5.

In operation, when the unloading device and the weighing system are in the "swung down" position, which is shown by the solid lines in the drawing, refuse container 1 is placed in the refuse container receiving device 2. The recognition data received from identification plate 7 is transmitted by recognition sensor 8 to recording unit 10 by way of signal amplifier 9. If no such data are collected, a signal is emitted by a signalling device associated with said sensor, so that the operator is alerted to the error. Once the container has been "recognized", the weighing system is lifted into the "up" position by the lifting cylinder 12. This position is shown in phantom in the drawing. After the lifting operation has been completed, locking device 6 releases sliding body 3, whereupon sliding body 3 transmits the value of the weight (gross weight) of the refuse container to measuring cell 5 while being displaced downwardly. The measuring cell passes said value to recording unit 10 by way of amplifier 9. Subsequently, sliding body 3 is again locked by locking device 6, whereupon the emptying operation is initiated. The container is emptied in the known manner by swivelling the support and swinging tube 11 clockwise by about 180° upwardly around a top swivel point not shown in the drawing, in order to empty the container 1 into the refuse collecting vehicle. This actual emptying operation is preferably manually controlled by the operator.

After the container has been emptied, support and swinging tube 11 is swung back into the lower position shown in the drawing, where the weighing system with the container is again in the position shown by the phantom lines. Locking device 6 is released and the dead weight of the container is measured by measuring cell 5, which again supplies the measured data to recording unit 10. After the measurement, sliding body 3 is locked by locking device 6, whereupon the weighing system is swivelled downwardly into the lower position shown by the solid lines by the downward swivel of the parallelogram levers 11*a*, 11*b*, and the refuse container is removed from device 2 by the operator.

After the refuse container has been removed, it is preferred that the weighing system is automatically adjusted to zero, for which purpose sliding body 3 is released once more by locking device 6. Subsequently, the device is ready for receiving another refuse container.

While only a single embodiment of the present invention has been shown and described, it will be obvious that many changes and modifications may be made thereunto without departing from the spirit and scope of the invention.

What is claimed is:

1. A method of recording the weight of refuse material which is emptied from a refuse container into a refuse collecting vehicle by means of a hydraulically operated unloading device, the refuse filled container being placed in the unloading device of the refuse collecting vehicle, the unloading device then being swung up to empty the container and swung back whereupon the container is removed from the unloading device, the method comprises:

(a) identifying the container after it is placed into the unloading device by means of an identification element arranged on the container which is caused to interact with a sensor arranged on the unloading device to thereby generate an identification signal;

(b) weighing the container a first time by means of a weighing system integrated in the unloading device prior to the unloading device being swung up to empty the container to thereby generate a weight signal;

(c) weighing the container a second time by means of the weighing system subsequent to the unloading device being swung back after emptying of the container to thereby generate a weight signal; and (d) recording and storing said two weight signals and said identification signal in a recording and storing system.

2. The method as defined in claim 1, wherein the steps of weighing said container comprise lifting said container before it is swung up to be emptied and weighing the container in the lifted position, weighing the container after it has been swung up and emptied and swung back into the lifted position, and lowering the container for removal from the unloading device.

3. The method as defined in claim 1, wherein if the container is not identified during the identifying step, the hydraulic system of the unloading device is automatically blocked.

4. The method as defined in claim 1, wherein the weighing system is automatically unlocked before each weighing step and automatically locked after each weighing step.

5. The method as defined in claim 1, wherein the weighing step are controlled timewise by position-signalling devices, and after each weighing step has been completed, the weighing system supplies control signals to the unloading device for automatically initiating the subsequent steps of the process.

6. A device for recording the weight of refuse material which is emptied from a refuse container into a refuse collecting vehicle by means of a hydraulically-operated unloading device, the refuse filled container being placed in the unloading device of the refuse collecting vehicle, the unloading device then being swung up the empty the container and swung back whereupon the container is removed from the unloading device, the device for recording the weight of refuse material comprising a weighing system incorporated in said unloading device.

7. The device as defined in claim 6, wherein said unloading device for receiving the container includes a sliding piece which is arranged in the weighing system and which is capable of vertical displacement and interaction with a measuring cell, and means for locking said sliding piece.

8. The device as defined in claim 7, wherein said sliding piece is comprised of a rod-like body displaceable in a tube.

9. The device as defined in claim 8, wherein the bottom of said sliding piece interacts with said measuring cell which is disposed in said tube.

10. The device as defined in claim 9, wherein said measuring cell is in the form of a piezo-resistive pressure absorber.

11. The device as defined in claim 9, wherein said measuring cell is a strain gauge.

12. The device as defined in claim 8, wherein said tube is a support tube integrated in the unloading device and supporting all parts of the weighing system.

13. The device as defined in claim 12, wherein said support tube is connected with the unloading device by pairs of parallelogram controllers which interact with at least one hoisting cylinder articulated on the unloading device.

* * * * *